US009229268B2

United States Patent
Lee et al.

(10) Patent No.: US 9,229,268 B2
(45) Date of Patent: Jan. 5, 2016

(54) LIQUID CRYSTAL DISPLAY DEVICE

(71) Applicant: LG Display Co., Ltd., Seoul (KR)

(72) Inventors: Se-Min Lee, Gyeonggi-do (KR); Jae-Jung Han, Seoul (KR); Joo-Young Yeon, Gyeonggi-do (KR); Mi-Na Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 146 days.

(21) Appl. No.: 13/719,399

(22) Filed: Dec. 19, 2012

(65) Prior Publication Data

US 2014/0022492 A1    Jan. 23, 2014

(30) Foreign Application Priority Data

Jul. 20, 2012    (KR) .................. 10-2012-0079605

(51) Int. Cl.
*G02F 1/1335*    (2006.01)

(52) U.S. Cl.
CPC ...... *G02F 1/133528* (2013.01); *G02F 1/13362* (2013.01); *G02F 1/133533* (2013.01); *G02F 1/133536* (2013.01); *G02F 2001/133543* (2013.01); *G02F 2001/133548* (2013.01); *G02F 2203/05* (2013.01); *G02F 2203/11* (2013.01)

(58) Field of Classification Search
CPC ............................................... G02F 1/133528
See application file for complete search history.

(56) References Cited

U.S. PATENT DOCUMENTS

| 4,049,338 | A | * | 9/1977 | Slocum ..................... 359/352 |
| 4,679,910 | A | * | 7/1987 | Efron et al. ................ 349/30 |
| 5,982,541 | A | * | 11/1999 | Li et al. ..................... 359/242 |
| 7,843,516 | B2 | * | 11/2010 | Cernasov ................... 349/12 |
| 2005/0012882 | A1 | * | 1/2005 | Karman ..................... 349/115 |
| 2005/0036077 | A1 | * | 2/2005 | Khan et al. ................. 349/36 |
| 2005/0094391 | A1 | * | 5/2005 | Campbell et al. .......... 362/231 |
| 2005/0264725 | A1 | * | 12/2005 | Chari et al. ................ 349/113 |
| 2007/0024776 | A1 | * | 2/2007 | Jeng et al. ................. 349/113 |
| 2010/0182538 | A1 | | 7/2010 | Takata ....................... 349/64 |
| 2011/0115747 | A1 | * | 5/2011 | Powell et al. .............. 345/175 |
| 2012/0206805 | A1 | * | 8/2012 | Meng et al. ............... 359/487.03 |

FOREIGN PATENT DOCUMENTS

| CN | 101512420 A | 8/2009 |
| WO | 2005043230 A1 | 5/2005 |

OTHER PUBLICATIONS

First Notification of Office Action dated Jul. 22, 2015 from the State Intellectual Property Office of China in counterpart Chinese Application No. 201210599062.X.

* cited by examiner

*Primary Examiner* — Timothy L Rude
(74) *Attorney, Agent, or Firm* — Morgan, Lewis & Bockius LLP (57) ABSTRACT

A liquid crystal display device including polarizing films that polarize infrared-range light as well as visible-range light and being operated in a visible light mode and an infrared light mode is disclosed. The liquid crystal display device includes a liquid crystal panel, polarizing films attached to the top and bottom surfaces of the liquid crystal panel, and a backlight unit disposed under the liquid crystal panel. At least one of the polarizing films includes an infrared polarizing film or a polarizing film for both visible and infrared light.

9 Claims, 8 Drawing Sheets

Prior Art

Prior Art

| NORMALLY BLACK MODE | POLARIZATION DIRECTION OF INFRARED LIGHT |
|---|---|
| BACKLIGHT UNIT |  |
| BACKLIGHT UNIT + POLARIZING FILM <br>  |  |
| BACKLIGHT UNIT + POLARIZING FILM + LIQUID CRYSTAL PANEL |  |
| BACKLIGHT UNIT + POLARIZING FILM + LIQUID CRYSTAL PANEL + POLARIZING FILM <br>  |  |

FIG. 10B

| NORMALLY BLACK MODE | POLARIZATION DIRECTION OF INFRARED LIGHT | |
|---|---|---|
| BACKLIGHT UNIT | ✳ | |
| BACKLIGHT UNIT<br>+ INFRARED POLARIZING FILM<br>⬚ POLARIZATION DIRECTION | ↗ | |
| BACKLIGHT UNIT<br>+ INFRARED POLARIZING FILM<br>+ LIQUID CRYSTAL PANEL | LIQUID CRYSTAL IS ARRANGED | ↘ |
| | LIQUID CRYSTAL IS NOT ARRANGED | ↗ |
| BACKLIGHT UNIT<br>+ INFRARED POLARIZING FILM<br>+ LIQUID CRYSTAL PANEL<br>+ INFRARED POLARIZING FILM<br>⬚ POLARIZATION DIRECTION ↘ | LIQUID CRYSTAL IS ARRANGED | ↘ |
| | LIQUID CRYSTAL IS NOT ARRANGED | ↗ |

LIQUID CRYSTAL DISPLAY DEVICE

This application claims the benefit of Korean Patent Application No. 10-2012-0079605, filed on Jul. 20, 2012 which is hereby incorporated by reference as if fully set forth herein.

BACKGROUND OF THE INVENTION

1. Field of the Invention

The present invention relates to a liquid crystal display device, and more particularly, to a liquid crystal display device using visible-range light as well as infrared-range light as light sources.

2. Discussion of the Related Art

With the progress of information-dependent society, the demand for various display devices has increased. To satisfy such demand, efforts have recently been made to develop flat panel display devices such as liquid crystal displays (LCDs), plasma display panels (PDPs), electro luminescent displays (ELDs), and vacuum fluorescent displays (VFD). Some types of such flat panel displays are being practically applied to various appliances for display purposes.

Among these, LCDs are currently the most widely used as a substitute for cathode ray tubes (CRTs) in association with mobile image display devices because LCDs have advantages of excellent image quality, lightness, slimness, and low power consumption. Various applications of LCDs are being developed in association with not only mobile image display devices such as monitors of notebook computers, but also monitors of TVs to receive and display broadcast signals, and monitors of computers.

Figure 1:
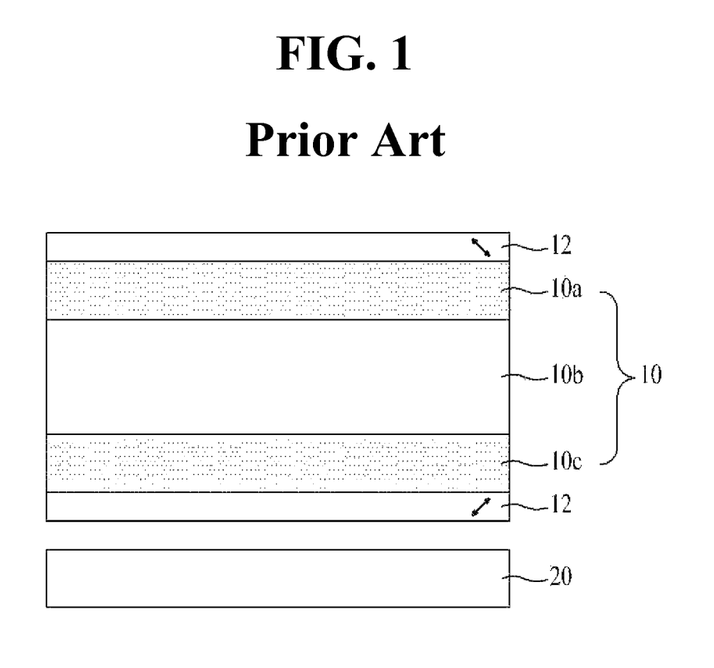
FIG. 1 is a cross-sectional view showing a conventional liquid crystal display device.

FIG. 1 is a cross-sectional view showing a conventional liquid crystal display device.

Referring to FIG. 1, a conventional liquid crystal display device includes a liquid crystal panel 10 including upper and lower substrates 10a and 10c opposite to each other and a liquid crystal layer 10b interposed between the upper and lower substrates 10a and 10c and a backlight unit 20 disposed over the bottom surface of the liquid crystal panel 10.

Since the liquid crystal display device as described above includes liquid crystal molecules having a thin and long structure and aligned in a predetermined orientation, the orientation of the liquid crystal molecules may be controlled by applying an electric field to the liquid crystal layer 10b. That is, liquid crystal molecules are arranged according to the electric field applied to the liquid crystal layer 10b to pass or block light received from the backlight unit 20, thereby displaying an image or text.

In particular, polarizing films 12 are attached to external surfaces of the upper and lower substrates 10a and 10c. In this regard, a polarization axis of the polarizing film 12 attached to the external surface of the upper substrate 10a is perpendicular to a polarization axis of the polarizing film 12 attached to the external surface of the lower substrate 10c.

Particularly, light emitted from the backlight unit 20 is polarized in a predetermined direction while passing through the polarizing film 12 disposed over the bottom surface of the liquid crystal panel 10. The light polarized in the predetermined direction is incident upon the liquid crystal panel 10. If the liquid crystal panel 10 is in a normally black mode in which black is displayed when a voltage is not applied, light polarized in a predetermined direction maintains the polarized direction while passing through the liquid crystal panel 10 to which voltage is not applied. The light cannot pass the polarizing film 12 of the top surface of the liquid crystal panel 10 and is absorbed by the polarizing film 12 to realize black. On the other hand, when a voltage is applied to the liquid crystal panel 10, light polarized in a predetermined direction is polarized in the opposite direction while passing through the liquid crystal panel 10 and passes through the polarizing film 12 of the top surface of the liquid crystal panel 10 to display an image.

In this regard, the polarizing film 12 is an absorption-type polarizing film prepared by dying poly vinyl alcohol (PVA) with iodine and controls polarization characteristics. Of light incident on the polarizing film 12 as described above, light vibrating in a direction in which iodide ions such as $I_3^-$ and $I_5^-$ are arranged is absorbed by the polarizing film 12, and light vibrating in other directions passes therethrough. However, the polarizing film including iodide ions may only polarize visible-range light.

Figure 2:
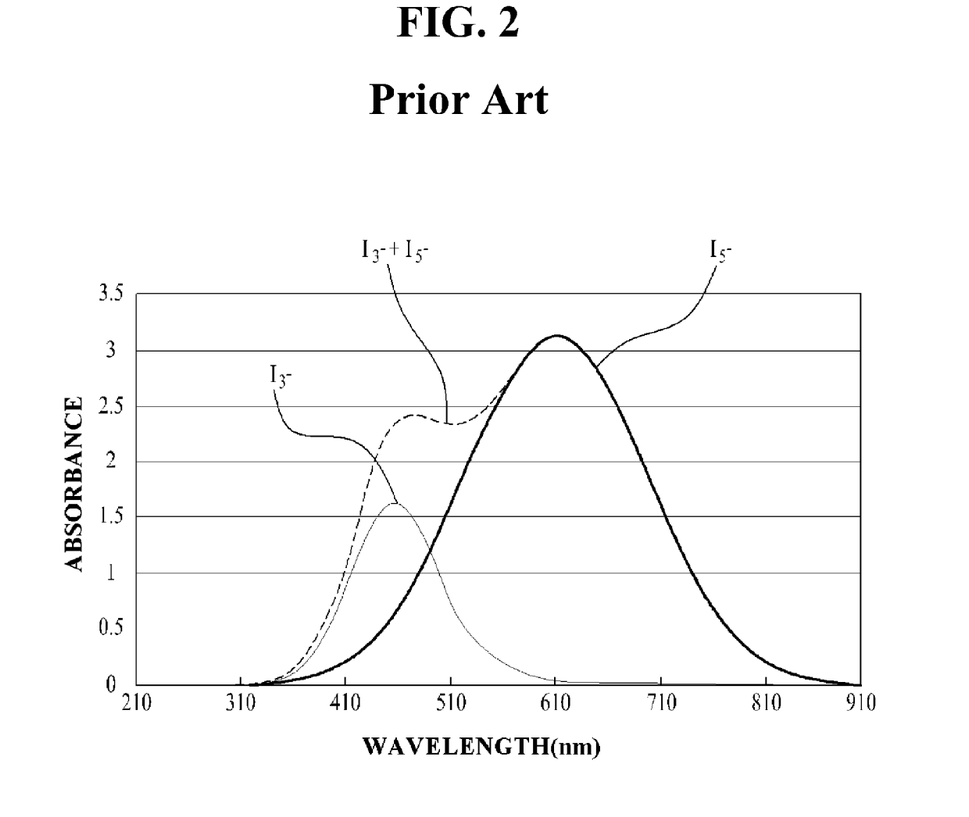
FIG. 2 is a graph illustrating absorbance of iodide ions.

FIG. 2 is a graph illustrating absorbance of iodide ions.

As shown in FIG. 2, $I_5^-$ ions absorb red light with a wavelength in the range of 500 nm to 700 nm, and $I_3^-$ ions absorb blue light with a wavelength in the range of 400 nm to 500 nm. Thus, a polarizing film including $I_5^-$ ions and $I_3^-$ ions has a low absorbance level at a wavelength less than 400 nm and greater than 700 nm, so as not to perform polarization of infrared-range light with a wavelength over 780 nm.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device including a polarizing film capable of polarizing infrared-range light and selectively using a visible light source and an infrared light source.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a liquid crystal panel, polarizing films attached to top and bottom surfaces of the liquid crystal panel, and a backlight unit disposed under the liquid crystal panel. At least one of the polarizing films includes an infrared polarizing film or a visible-infrared polarizing film for both of visible and infrared light.

A polarization axis of the polarizing film attached to the top surface of the liquid crystal panel may be perpendicular to a polarization axis of the polarizing film attached to the bottom surface of the liquid crystal panel.

The polarizing films attached to the top and bottom surfaces of the liquid crystal panel may include the infrared polarizing film and a visible polarizing film sequentially stacked.

The polarizing film attached to the top surface of the liquid crystal panel may include the infrared polarizing film and the visible polarizing film sequentially stacked, and the polarizing film attached to the bottom surface of the liquid crystal panel may include the visible polarizing film and the infrared polarizing film sequentially stacked.

The polarizing film attached to the top surface of the liquid crystal panel may include the infrared polarizing film and the visible polarizing film sequentially stacked, and the polarizing film attached to the bottom surface of the liquid crystal panel may include the visible-infrared polarizing film.

The polarizing film attached to the top surface of the liquid crystal panel may include the visible-infrared polarizing film and the visible polarizing film sequentially stacked, and the polarizing film attached to the bottom surface of the liquid crystal panel may include the visible-infrared polarizing film.

The infrared polarizing film may transmit all visible-range light and polarizes infrared-range light.

The visible-infrared polarizing film may polarize visible-range and infrared-range light.

The backlight unit may include a first light source emitting visible-range light, and a second light source emitting infrared-range light.

The backlight unit may be a direct or edge type backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A liquid crystal display device according to the present invention includes a liquid crystal panel, polarizing films attached to top and bottom surfaces of the liquid crystal panel, and a backlight unit disposed under the liquid crystal panel. At least one of the polarizing films includes an infrared polarizing film or a polarizing film for both visible and infrared light, so that the liquid crystal display device may use visible-range light as well as infrared-range light as light sources. In this regard, a polarization axis of the polarizing film attached to the top surface of the liquid crystal panel is perpendicular to a polarization axis of the polarizing film attached to the bottom surface of the liquid crystal panel.

First Embodiment

Figure 3:
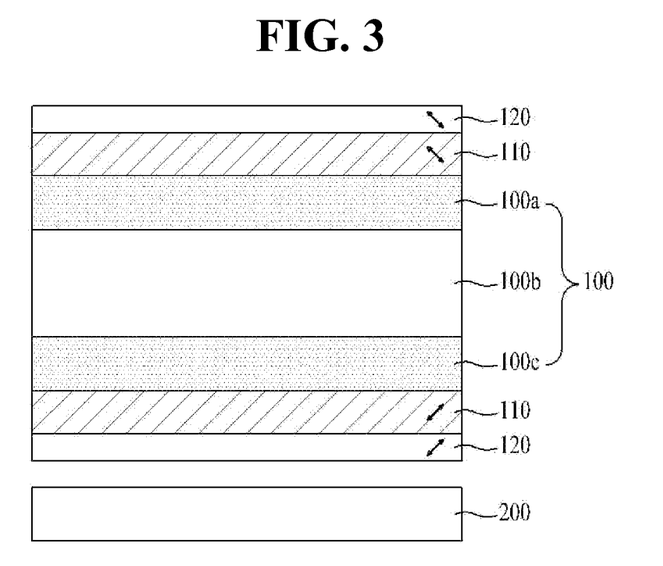
FIG. 3 is a cross-sectional view showing a liquid crystal display device according to a first embodiment of the present invention.

FIG. 3 is a cross-sectional view showing a liquid crystal display device according to a first embodiment of the present invention.

As shown in FIG. 3, the liquid crystal display device according to the first embodiment of the present invention includes a liquid crystal panel 100 that includes an upper substrate 100a and a lower substrate 100c opposite to each other and a liquid crystal layer 100b interposed between the upper substrate 100a and the lower substrate 100c, polarizing films attached to the top and bottom surfaces of the liquid crystal panel 100, and a backlight unit 200 disposed under the liquid crystal panel 100.

Specifically, the polarizing film attached to the top surface of the liquid crystal panel 100 has a structure in which an infrared polarizing film 110 and a visible polarizing film 120 are sequentially stacked. The polarizing film attached to the bottom surface of the liquid crystal panel 100 also has a structure in which the infrared polarizing film 110 and the visible polarizing film 120 are sequentially stacked. In this regard, a polarization axis of the infrared polarizing film 110 and the visible polarizing film 120 attached to the top surface of the liquid crystal panel 100 is perpendicular to a polarization axis of the infrared polarizing film 110 and the visible polarizing film 120 of the bottom surface of the liquid crystal panel 100.

In addition, the backlight unit 200 disposed under the liquid crystal panel 100 may be a direct or edge type backlight unit according to backlight location.

Figure 4A:
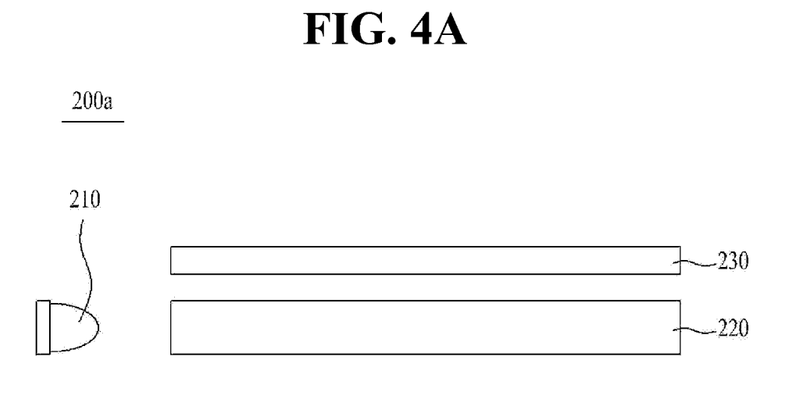
FIG. 4A is a cross-sectional view showing an edge type backlight unit of a liquid crystal display device according to the present invention.
Figure 4B:
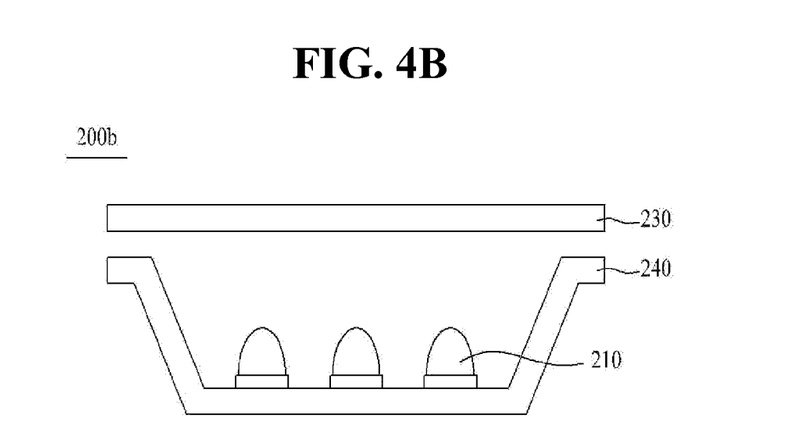
FIG. 4B is a cross-sectional view showing a direct type backlight unit of a liquid crystal display device according to the present invention.

FIG. 4A is a cross-sectional view showing an edge type backlight unit 200a of a liquid crystal display device according to the present invention. FIG. 4B is a cross-sectional view showing a direct type backlight unit 200b of a liquid crystal display device according to the present invention.

As shown in FIG. 4A, the edge type backlight unit 200a includes a light guide plate 220, a light source 210 disposed at one side of the light guide plate 220, and an optical sheet 230 disposed over the light guide plate 220. Although not shown herein, the light source 210 includes a first light source emitting visible-range light and a second light source emitting infrared-range light. The light sources 210 may be disposed at both sides of the light guide plate 220.

Light emitted from the light source 210 is incident upon the light guide plate 220 via the side of the light guide plate 220 and is transmitted to the optical sheet 230 disposed over the light guide plate 220 to be supplied to the liquid crystal panel. The optical sheet 230 includes a diffusion sheet, a prism sheet, or the like, and a reflection sheet is disposed under the light guide plate 220, so that light proceeding downward from the light guide plate 220 is reflected upward from the light guide plate 220.

In addition, as shown in FIG. 4B, in the direct type backlight unit 200b, the light source 210 is accommodated in a mold frame 240, so that light emitted from the light source 210 is incident upon the optical sheet 230 disposed above the mold frame 240 to be supplied to the liquid crystal panel via the optical sheet 230. In this regard, the light source 210 includes a first light source emitting visible-range light and a second light source emitting infrared-range light.

The liquid crystal panel 100 on which light emitted from the backlight unit 200 is incident may be implemented in a variety modes such as twisted nematic (TN) mode, in plane switching (IPS) mode, and vertical alignment (VA) mode, and various modifications including a color filter on TFT (COT) structure and a TFT on color filter (TOC) structure may be possible. In addition, the liquid crystal panel 100 may be implemented in a variety of forms such as a reflective type, a transmissive type, and a semi-transmissive type.

As described above, the infrared polarizing film 110 and the visible polarizing film 120 are sequentially stacked on the top surface of the liquid crystal panel 100. As described above, the visible polarizing film 120 that is an absorption type polarizing film prepared by dying poly vinyl alcohol (PVA) with iodine and controlling polarization characteristics may polarize visible-range light with a wavelength in the range of 380 nm to 780 nm. In addition, the infrared polarizing film 110 that is a reflective polarizing film, such as a cholesteric liquid crystal (CLC)-containing film, a reflective polarizing sheet such as a dual brightness enhancement film (DBEF), and a wire grid polarizer may polarize infrared-range light with a wavelength 780 nm or more.

Figure 5:
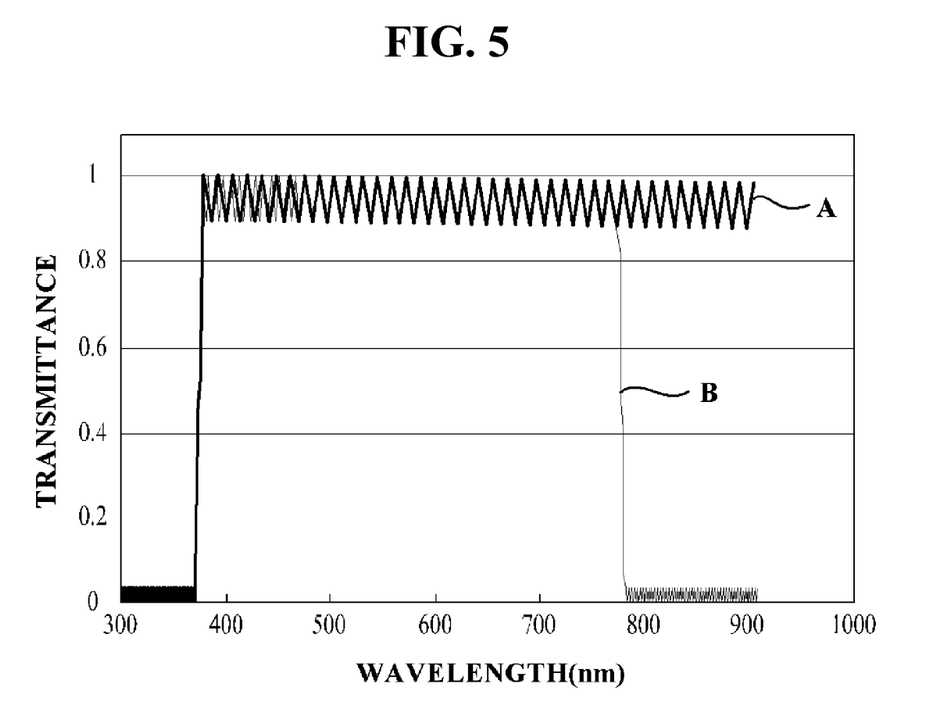
FIG. 5 is a graph illustrating transmittance of an infrared polarizing film with respect to wavelength.

FIG. 5 is a graph illustrating transmittance of an infrared polarizing film 110 with respect to wavelength.

As shown in FIG. 5, the infrared polarizing film 110 transmits all visible-range light with a wavelength of 380 nm or more. Specifically, both of visible light A with a specific polarization direction and visible light B with a polarization direction perpendicular to that of the light A pass through the infrared polarizing film 110 in the visible light range. However, the light A passes through the infrared polarizing film 110, but all of the light B is reflected by the infrared polarizing film 110 in an infrared light range with a wavelength of 780 nm or more, so that transmittance of the light B is nearly 0. Thus, the infrared polarizing film 110 may polarize light by transmitting light with a specific polarization direction and reflecting light with a polarization direction perpendicular to that of the transmitted light.

Thus, the liquid crystal display device according to the first embodiment of the present invention includes both of the visible polarizing film 120 and the infrared polarizing film 110, and thus a visible light mode and an infrared light mode may be selectively used.

Specifically, in the visible light mode, only the first light source that emits visible-range light is turned on. Visible-range light emitted from the backlight unit 200 is polarized in a predetermined direction while passing through the visible polarizing film 120 disposed over the bottom surface of the liquid crystal panel 100 and passes through the infrared polarizing film 110. In addition, since the infrared polarizing film 110 transmits all visible-range light, light polarized in a predetermined direction proceeds toward the liquid crystal panel 100 while maintaining the polarized direction.

For example, if the liquid crystal panel 100 is in the normally black mode in which black is realized when voltage is not applied thereto, light polarized in a predetermined direction maintains the polarized direction while passing through the liquid crystal panel 110 to which a voltage is not applied and the infrared polarizing film 110 disposed over the top surface of the liquid crystal panel 100. In addition, since the polarization axis of the visible polarizing film 120 disposed over the top surface of the liquid crystal panel 100 is perpendicular to the polarization axis of the visible polarizing film 120 disposed over the bottom surface of the liquid crystal panel 100, light that has passed through the liquid crystal panel 100 cannot pass through the visible polarizing film 120 disposed over the top surface of the liquid crystal panel 100 and is absorbed thereby to realize black.

On the other hand, when a voltage is applied to the liquid crystal panel 100, light polarized in a predetermined direction is polarized in the opposite direction while passing through the liquid crystal panel 100 and passes through the infrared polarizing film 110 disposed over the top surface of the liquid crystal panel 100. Then, the light passes through the visible polarizing film 120 attached to the top surface of the liquid crystal panel 100 to realize an image.

In addition, in the infrared light mode, only the second light source that emits infrared-range light is turned on. Infrared-range light emitted from the backlight unit 200 passes through the visible polarizing film 120 attached to the bottom surface of the liquid crystal panel 100 and is polarized in a predetermined direction while passing through the infrared polarizing film 110 to proceed toward the liquid crystal panel 100.

If the liquid crystal panel 100 is in the normally black mode as described above, light polarized in a predetermined direction maintains the polarized direction while passing through the liquid crystal panel 100 to which voltage is not applied. In addition, since the polarization axis of the infrared polarizing film 110 disposed over the top surface of the liquid crystal panel 100 is perpendicular to the polarization axis of the infrared polarizing film 110 disposed over the bottom surface of the liquid crystal panel 100, light cannot pass through the infrared polarizing film 110 disposed over the top surface of the liquid crystal panel 100 and is reflected thereby to realize black.

On the other hand, when a voltage is applied to the liquid crystal panel 100, light polarized in a predetermined direction is polarized in the opposite direction while passing through the liquid crystal panel 100 and passes through the infrared polarizing film 110 disposed over the top surface of the liquid crystal panel 100. Then, the light passes through the visible polarizing film 120 attached to the top surface of the liquid crystal panel 100 to realize an image.

The liquid crystal display device according to the first embodiment of the present invention as described above includes both of the visible polarizing film 120 and the infrared polarizing film 110, and thus a visible light mode and an infrared light mode may be selectively used. Particularly, the visible polarizing film 120 may be disposed on the uppermost layer in order to prevent reduction in visibility due to reflection of external light.

Second Embodiment

Figure 6:
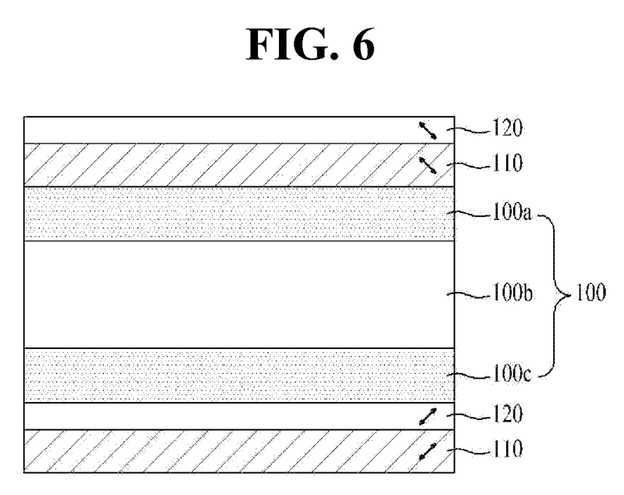
FIG. 6 is a cross-sectional view showing a liquid crystal display device according to a second embodiment of the present invention.

FIG. 6 is a cross-sectional view showing a liquid crystal display device according to a second embodiment of the present invention.

Referring to FIG. 6, as compared to the liquid crystal display device according to the first embodiment of the present invention, the order of the polarizing films disposed over the bottom surface of the liquid crystal panel is reversed in the liquid crystal display device according to the second embodiment of the present invention. The polarizing film attached to the top surface of the liquid crystal panel 100 has a structure in which the infrared polarizing film 110 and the visible polarizing film 120 are sequentially stacked, and the polarizing film attached to the bottom surface of the liquid crystal panel 100 has a structure in which the visible polarizing film 120 and the infrared polarizing film 110 are sequentially stacked. In this regard, a polarization axis of the infrared polarizing film 110 and the visible polarizing film 120 attached to the top surface of the liquid crystal panel 100 is perpendicular to a polarization axis of the infrared polarizing film 110 and the visible polarizing film 120 attached to the bottom surface of the liquid crystal panel 100.

That is, the liquid crystal display devices according to the first and second embodiments of the present invention include both of the visible polarizing film 120 and the infrared polarizing film 110 on the top and bottom surfaces of the liquid crystal panel 100, and thus a visible light mode and an infrared light mode may be selectively used.

Third Embodiment

Figure 7:
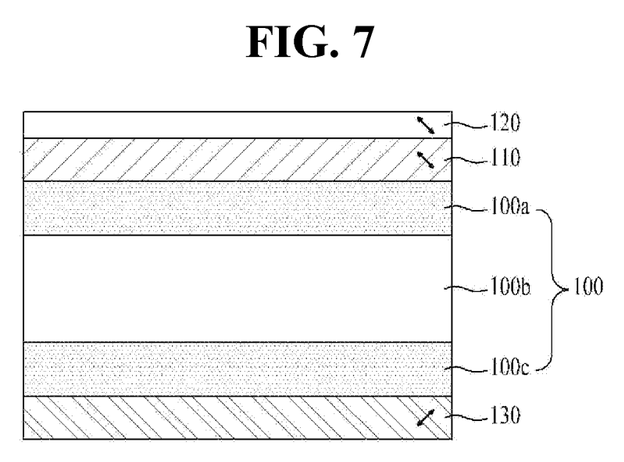
FIG. 7 is a cross-sectional view showing a liquid crystal display device according to a third embodiment of the present invention.

FIG. 7 is a cross-sectional view showing a liquid crystal display device according to a third embodiment of the present invention.

As shown in FIG. 7, in the liquid crystal display device according to the third embodiment of the present invention, a polarizing film attached to the top surface of the liquid crystal panel 100 has a structure in which an infrared polarizing film 110 and a visible polarizing film 120 are sequentially stacked, and a polarizing film attached to the bottom surface of the liquid crystal panel 100 is a polarizing film for both visible and infrared light (visible-infrared polarizing film) 130. Here, a polarization axis of the polarizing film attached to the top surface of the liquid crystal panel 100 is perpendicular to a polarization axis of the polarizing film attached to the bottom surface of the liquid crystal panel 100.

In this regard, the visible-infrared polarizing film 130 that is a reflective polarizing film, such as a cholesteric liquid crystal (CLC)-containing film, a reflective polarizing sheet such as a dual brightness enhancement film (DBEF), and a wire grid polarizer, may polarize visible light with a wavelength in the range of 380 nm to 780 nm as well as infrared light with a wavelength 780 nm or more.

Figure 8:
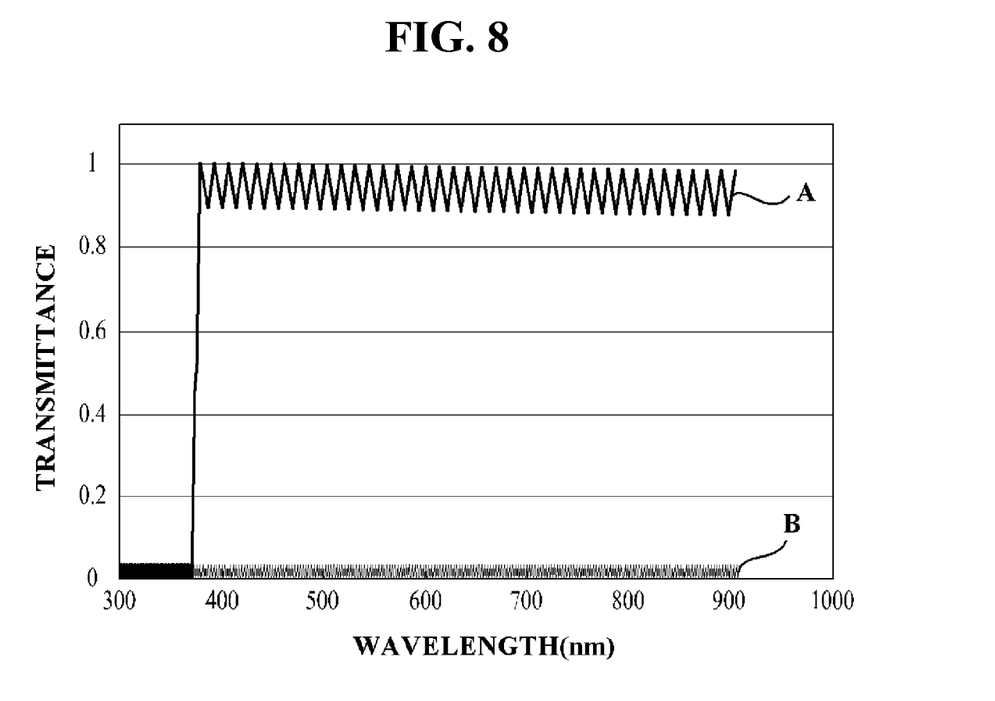
FIG. 8 is a graph illustrating transmittance of a polarizing film for both visible and infrared light with respect to wavelength.

FIG. 8 is a graph illustrating transmittance of the visible-infrared polarizing film 130 with respect to wavelength.

As shown in FIG. 8, the visible-infrared polarizing film 130 transmits all light A with a specific polarization direction, but reflects all light B with a polarization axis perpendicular to that of the light A in a visible light range of 380 nm or more. Similarly, the visible-infrared polarizing film 130 transmits the light A and reflects all of the light B in an infrared range, so that transmittance of the light B is nearly 0. Thus, the visible-infrared polarizing film 130 transmits light with a specific polarization direction and reflects light with a polarization direction perpendicular to that of the transmitted light in the visible light range. In the infrared light range, the visible-infrared polarizing film 130 also transmits light with a specific polarization direction and reflects light with a polarization direction perpendicular to that of the transmitted light.

Thus, the liquid crystal display device according to the third embodiment of the present invention includes the visible polarizing film 120, the infrared polarizing film 110, and the visible-infrared polarizing film 130, and thus a visible light mode and an infrared light mode may be selectively used. Specifically, in the visible light mode, a first light source that emits visible-range light is turned on. Visible-range light emitted from the backlight unit 200 is polarized in a predetermined direction while passing through the visible-infrared polarizing film 130 disposed over the bottom surface of the liquid crystal panel 100.

In addition, if the liquid crystal panel 100 is in the normally black mode, light polarized in a predetermined direction maintains the polarized direction while passing through the liquid crystal panel 110 to which a voltage is not applied and the infrared polarizing film 110 disposed over the top surface of the liquid crystal panel 100. The light cannot pass through the visible polarizing film 120 disposed over the top surface of the liquid crystal panel 100 and is absorbed thereby to realize black.

On the other hand, when a voltage is applied to the liquid crystal panel 100, light polarized in a predetermined direction is polarized in the opposite direction while passing through the liquid crystal panel 100 and passes through the infrared polarizing film 110 disposed over the top surface of the liquid crystal panel 100. Then, the light passes through the visible polarizing film 120 attached to the top surface of the liquid crystal panel 100 to realize an image.

In addition, in the infrared light mode, only a second light source that emits infrared-range light is turned on. Infrared-range light emitted from the backlight unit 200 is polarized in a predetermined direction while passing through the visible-infrared polarizing film 130 disposed over the bottom surface of the liquid crystal panel 100.

For example, if the liquid crystal panel 100 is in the normally black mode as described above, light polarized in a predetermined direction maintains the polarized direction while passing through the liquid crystal panel 100 to which a voltage is not applied. The light cannot pass the infrared polarizing film 110 disposed over the top surface of the liquid crystal panel 100 and is reflected.

On the other hand, when a voltage is applied to the liquid crystal panel 100, light polarized in a predetermined direction is polarized in the opposite direction while passing through the liquid crystal panel 100 and passes through the infrared polarizing film 110 disposed over the top surface of the liquid crystal panel 100. Then, the light passes through the visible polarizing film 120 attached to the top surface of the liquid crystal panel 100 to realize an image.

That is, the liquid crystal display device according to the third embodiment of the present invention includes the visible polarizing film 120 and the infrared polarizing film 110 over the top surface of the liquid crystal panel 100, and the visible-infrared polarizing film 130 over the bottom surface of the liquid crystal panel 100, and thus a visible light mode and an infrared light mode may be selectively used. Particularly, the liquid crystal display device according to the third embodiment of the present invention is thinner than the liquid crystal display devices according to the first and second embodiments of the present invention since only the visible-infrared polarizing film 130 is attached to the bottom surface of the liquid crystal panel 100.

Fourth Embodiment

Figure 9:
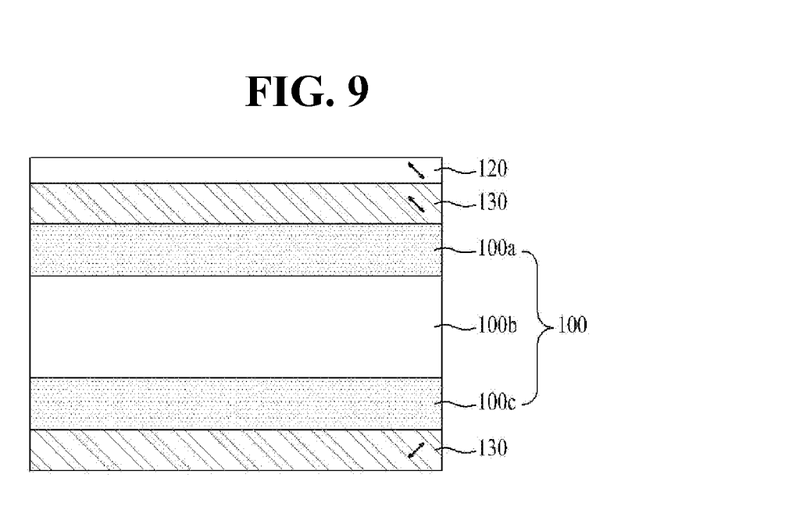
FIG. 9 is a cross-sectional view showing a liquid crystal display device according to a fourth embodiment of the present invention.

FIG. 9 is a cross-sectional view showing a liquid crystal display device according to a fourth embodiment of the present invention.

As shown in FIG. 9, in the liquid crystal display device according to the fourth embodiment of the present invention, a polarizing film attached to the top surface of the liquid crystal panel 100 has a structure in which a visible-infrared polarizing film 130 and a visible polarizing film 120 are sequentially stacked, and a polarizing film attached to the bottom surface of the liquid crystal panel 100 is the visible-infrared polarizing film 130. Here, a polarization axis of the polarizing film attached to the top surface of the liquid crystal panel 100 is perpendicular to a polarization axis of the polarizing film attached to the bottom surface of the liquid crystal panel 100.

Specifically, in the visible light mode, a first light source that emits visible-range light is turned on. Visible-range light emitted from the backlight unit 200 is polarized in a predetermined direction while passing through the visible-infrared polarizing film 130 disposed over the bottom surface of the liquid crystal panel 100.

In addition, if the liquid crystal panel 100 is in the normally black mode, light polarized in a predetermined direction maintains the polarized direction while passing through the liquid crystal panel 100 to which a voltage is not applied and cannot pass through the visible-infrared polarizing film 130 and is reflected thereby to realize black.

On the other hand, when a voltage is applied to the liquid crystal panel 100, light polarized in a predetermined direction is polarized in the opposite direction while passing through the liquid crystal panel 100 and passes through the visible-infrared polarizing film 130 disposed over the top surface of the liquid crystal panel 100. Then, the light passes through the visible polarizing film 120 attached to the top surface of the liquid crystal panel 100 to realize an image.

In addition, in the infrared light mode, a second light source that emits infrared-range light is turned on. Infrared-range light emitted from the backlight unit 200 is polarized in a predetermined direction while passing through the visible-infrared polarizing film 130 disposed over the bottom surface of the liquid crystal panel 100.

For example, if the liquid crystal panel 100 is in the normally black mode as described above, light polarized in a predetermined direction maintains the polarized direction while passing through the liquid crystal panel 100 to which a voltage is not applied. The light cannot pass through the visible-infrared polarizing film 130 disposed over the top surface of the liquid crystal panel 100 and is reflected.

On the other hand, when a voltage is applied to the liquid crystal panel 100, light polarized in a predetermined direction is polarized in the opposite direction while passing through the liquid crystal panel 100 and passes through the visible-infrared polarizing film 130 disposed over the top surface of the liquid crystal panel 100. Then, the light passes through the visible polarizing film 120 attached to the top surface of the liquid crystal panel 100 to realize an image.

That is, the liquid crystal display device according to the fourth embodiment of the present invention includes the visible-infrared polarizing film 130 and the visible polarizing film 120 over the top surface of the liquid crystal panel 100, and the visible-infrared polarizing film 130 over the bottom surface of the liquid crystal panel 100, and thus a visible light mode and an infrared light mode may be selectively used. Particularly, by disposing the visible-infrared polarizing film 130 over the top surface of the liquid crystal panel 100 and disposing the visible polarizing film 120 over the visible-infrared polarizing film 130, reduction in visibility by reflection of external light may be prevented as described above.

Figure 10A:
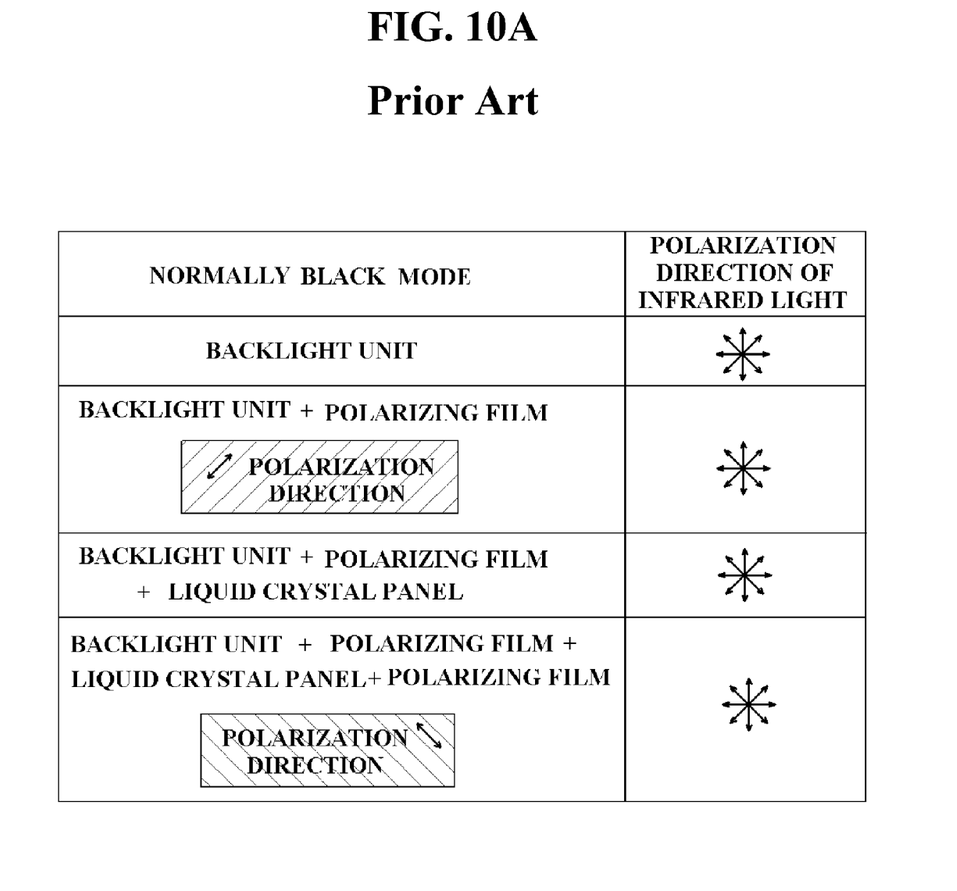
FIG. 10A is a table illustrating polarization directions of light when a conventional liquid crystal display device is operated using an infrared light source.
Figure 10B:
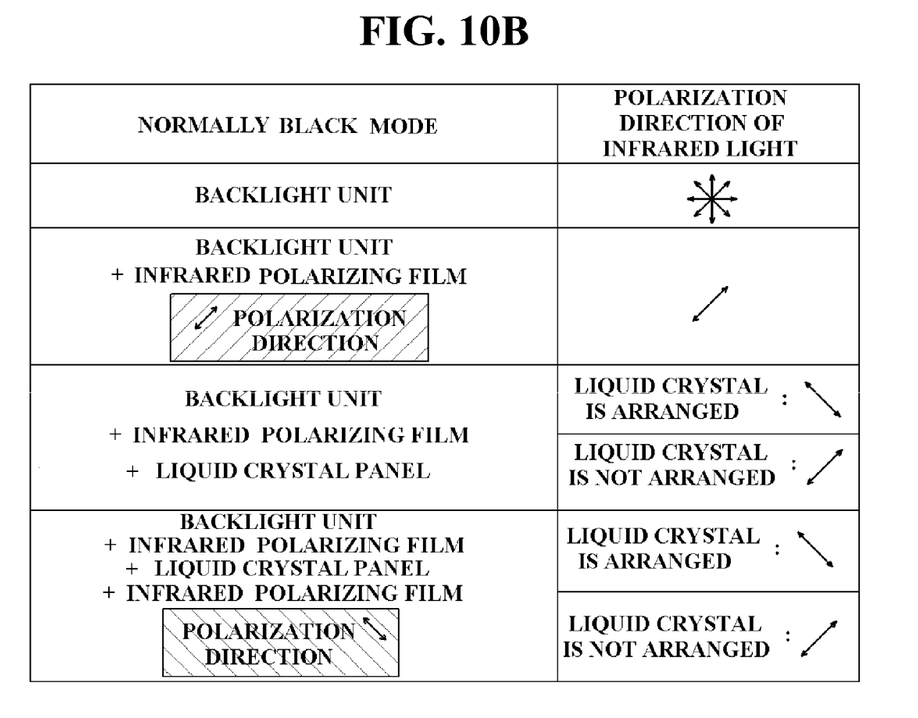
FIG. 10B is a table illustrating polarization directions of light when a liquid crystal display device according to the present invention is operated using an infrared light source.

FIG. 10A is a table illustrating polarization directions of light when a conventional liquid crystal display device is operated using an infrared light source. FIG. 10B is a table illustrating polarization directions of light when a liquid crystal display device according to the present invention is operated using an infrared light source. As described above, a conventional liquid crystal display device includes a general polarizing film capable of polarizing only visible-range light. Accordingly, the conventional liquid crystal display device cannot polarize infrared-range light, and thus infrared light emitted from the backlight unit passes through the liquid crystal panel and the polarizing film as shown in FIG. 10A. Thus, an image may be realized using a visible light source but cannot be realized using an infrared light source.

However, in the liquid crystal display device according to the present invention including the infrared polarizing film, infrared-range light emitted from the backlight unit is polarized in a predetermined direction while passing through the infrared polarizing film as shown in FIG. 10B. In addition, when the liquid crystal panel is operated, the polarization direction is reversed, and light passes through the infrared polarizing film disposed over the top surface of the liquid crystal panel. Thus, an image may be realized using the infrared light source. On the other hand, if the liquid crystal panel is not operated, light cannot pass through the infrared polarizing film disposed over the top surface of the liquid crystal panel.

Since the liquid crystal display device according to the present invention includes a polarizing film capable of polarizing infrared-range light, the liquid crystal display device may be operated in a visible light mode using visible light a and in an infrared light mode using infrared light.

As described above, a liquid crystal display device according to the present invention includes polarizing films capable of polarizing infrared-range light so that a visible light source and an infrared light source may be used. Thus, the liquid crystal display device may be operated in a visible light mode and an infrared light mode.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
a liquid crystal panel;
polarizing films attached to top and bottom surfaces of the liquid crystal panel; and
a backlight unit disposed under the liquid crystal panel,
wherein the backlight unit comprises a first light source emitting visible-range light, and a second light source emitting infrared-range light,
the display device configured to selectively operate in a visible light mode and an infrared light mode,
wherein in the visible light mode, only the first light source is turned on, and in the infrared light mode, only the second light source is turned on,
wherein at least one of the polarizing films comprises an infrared polarizing film, and
wherein the polarizing films attached to the top surface of the liquid crystal panel comprise the infrared polarizing film and a visible polarizing film sequentially stacked, and
wherein the visible polarizing film is on an uppermost layer of the polarizing films relative to the liquid crystal panel to prevent reduction in visibility due to reflection of external light.

2. The liquid crystal display device of claim 1, wherein a polarization axis of the polarizing film attached to the top surface of the liquid crystal panel is perpendicular to a polarization axis of the polarizing film attached to the bottom surface of the liquid crystal panel.

3. The liquid crystal display device of claim 1, wherein the polarizing films attached to the bottom surface of the liquid crystal panel comprise the infrared polarizing film and the visible polarizing film sequentially stacked.

4. The liquid crystal display device of claim 1, wherein the polarizing film attached to the bottom surface of the liquid crystal panel comprises the visible polarizing film and the infrared polarizing film sequentially stacked.

5. The liquid crystal display device of claim 1, wherein the polarizing film attached to the top surface of the liquid crystal panel comprises the infrared polarizing film and the visible polarizing film sequentially stacked, and
the polarizing film attached to the bottom surface of the liquid crystal panel comprises the visible-infrared polarizing film.

6. The liquid crystal display device of claim 1, wherein the polarizing film attached to the top surface of the liquid crystal panel comprises the visible-infrared polarizing film and the visible polarizing film sequentially stacked, and
the polarizing film attached to the bottom surface of the liquid crystal panel comprises the visible-infrared polarizing film.

7. The liquid crystal display device of claim 1, wherein the infrared polarizing film transmits all visible-range light and polarizes infrared-range light.

8. The liquid crystal display device of claim 1, wherein the visible-infrared polarizing film polarizes visible-range and infrared-range light.

9. The liquid crystal display device of claim 1, wherein the backlight unit is a direct or edge type backlight unit.

* * * * *